United States Patent [19]

Hayakawa et al.

[11] Patent Number: 5,468,810
[45] Date of Patent: Nov. 21, 1995

[54] PROCESS FOR PRODUCING A PROPYLENE BLOCK COPOLYMER

[75] Inventors: Tetsuo Hayakawa; Tokuji Inoue; Hiroyuki Asaga, all of Ichihara, Japan

[73] Assignee: Ube Industries, Ltd., Yamaguchi, Japan

[21] Appl. No.: 280,522

[22] Filed: Jul. 26, 1994

[30] Foreign Application Priority Data

Jul. 27, 1993 [JP] Japan ................................. 5-185175
Jun. 17, 1994 [JP] Japan ................................. 6-135913

[51] Int. Cl.⁶ ................................................. C08F 297/08
[52] U.S. Cl. ......................... 525/244; 525/243; 525/247; 525/323; 525/268; 526/74; 526/901
[58] Field of Search ................................. 525/323, 243, 525/244, 53, 247; 526/74, 901

[56] References Cited

U.S. PATENT DOCUMENTS

| | | |
|---|---|---|
| 4,363,901 | 12/1982 | Kikuta et al. |
| 4,390,669 | 6/1983 | Morita et al. |
| 4,739,015 | 4/1988 | Toyota et al. |
| 4,740,551 | 4/1988 | Foster |
| 4,760,113 | 7/1988 | Chiba et al. |
| 4,882,380 | 11/1989 | Ficker et al. |
| 4,978,722 | 12/1990 | Goko et al. |

FOREIGN PATENT DOCUMENTS

| | | |
|---|---|---|
| 53-30686 | 3/1978 | Japan |
| 56-151713 | 11/1981 | Japan |
| 58-213012 | 12/1983 | Japan |
| 61-69823 | 4/1986 | Japan |
| 61-69821 | 4/1986 | Japan |
| 61-69822 | 4/1986 | Japan |
| 61-215613 | 9/1986 | Japan |
| 62-135509 | 6/1987 | Japan |
| 62-132912 | 6/1987 | Japan |
| 63-43915 | 2/1988 | Japan |
| 63-146914 | 6/1988 | Japan |
| 2-107995 | 5/1990 | Japan |
| 3-292311 | 12/1991 | Japan |
| 4-136010 | 5/1992 | Japan |
| 4-331219 | 11/1992 | Japan |

Primary Examiner—Carman J. Seccuro, Jr.
Attorney, Agent, or Firm—Finnegan, Henderson Farabow, Garrett & Dunner

[57] ABSTRACT

A propylene block copolymer having a high rigidity and an excellent impact strength is produced by (1) first polymerizing propylene or a mixture of propylene and another ethylenically unsaturated hydrocarbon monomer in the presence of a catalyst comprising a Ti-containing solid component (A), an organic Al compound-containing component (B) and an alkoxyl silicon compound-containing component (C), and (2) second copolymerizing, in a gas phase, propylene and another ethylenically unsaturated hydrocarbon monomer in the presence of the first crystalline polymer of step (1) by re-using the catalyst of first polymerization, and in the presence of a saturated hydrocarbon with 6 or more carbon atoms, thereby forming an elastomeric fraction incorporated into the crystalline polymeric fraction.

15 Claims, 1 Drawing Sheet

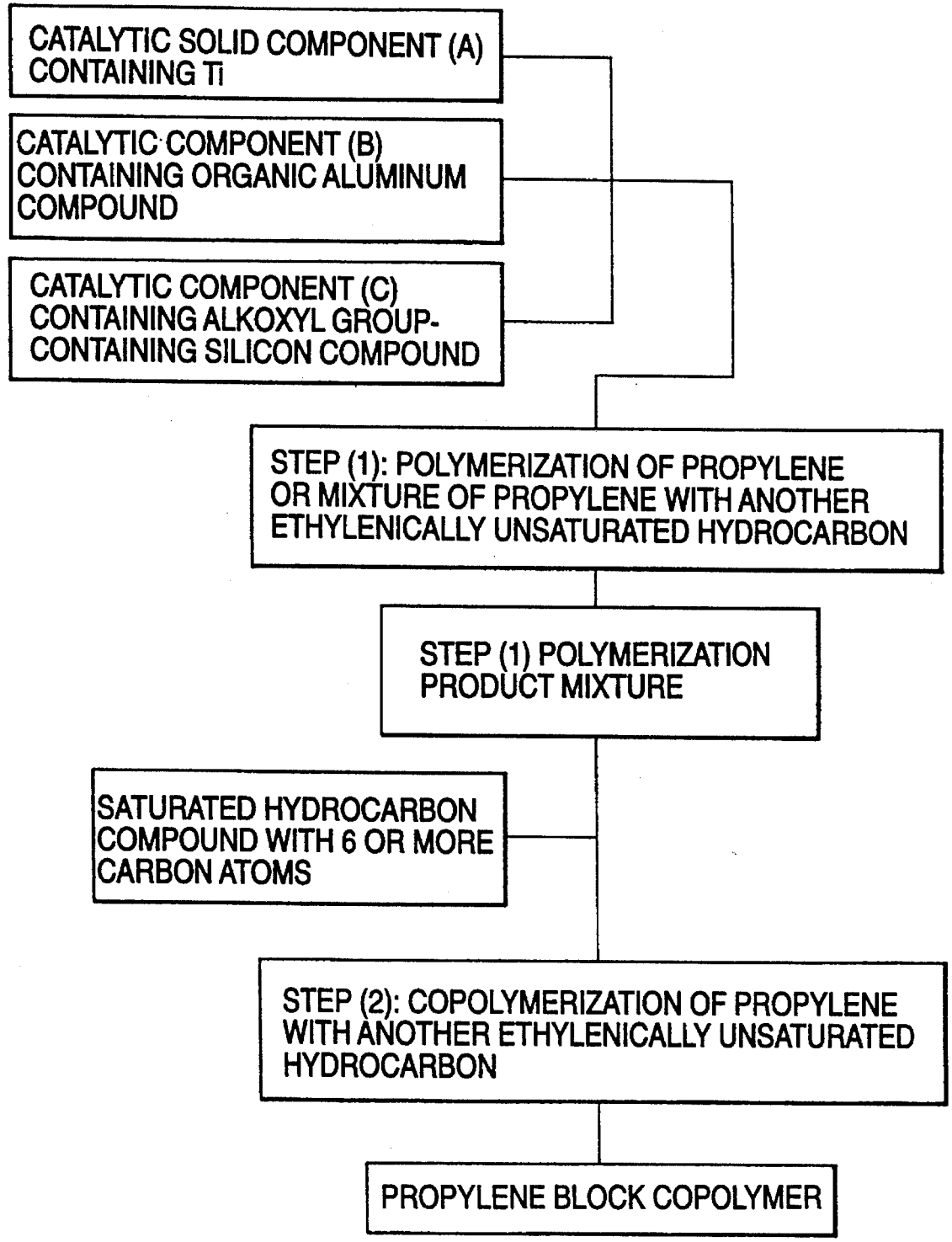

333333333333333333333333333333
PROCESS FOR PRODUCING A PROPYLENE BLOCK COPOLYMER

BACKGROUND OF THE INVENTION

1. Field of the Invention

The present invention relates to a process for producing a propylene block copolymer. More particularly, the present invention relates to a process for producing a propylene block copolymer having a high rigidity and an excellent impact strength.

2. Description of the Related Art

A two step process for producing a propylene block copolymer is known. In this two step process, first, a stereoregular propylene polymer or copolymer is prepared by homopolymerizing propylene or by copolymerizing propylene and another α-olefin monomer; and second, propylene and another α-olefin are copolymerized in a gas phase in the presence of the propylene homopolymer or copolymer prepared in the first step.

The product produced by the above-mentioned conventional process consists of a uniform and tight mixture of the polymers and copolymers prepared in the first and second steps. However, this polymeric mixture is commonly referred to as a propylene block copolymer.

This conventional process is useful for producing a propylene block copolymer having a well-balanced rigidity and impact resistance.

However, since this conventional process is composed of a first step of polymerization of propylene in a liquid phase and a second step of copolymerization of propylene and another α-olefin monomer in a gas phase, it is most important to maintain the catalytic activity of the catalyst in the second step at a high level. Each of the first and second steps may be carried out in a plurality of polymerization reactors.

Further, the conventional process is disadvantageous in that in the second step, since the stickness of the polymerization mixture increases and the fluidity of the mixture reduces, the reactor and related conduit lines are sometimes blocked and scale is formed on the inside surfaces of the reactor and conduits, and since the monomer concentration is low, the productivity per unit time is very low. Accordingly, it is strongly demanded to solve the above-mentioned problems.

In the stereoregular polymerization of propylene, generally, a supported type polymerization catalyst having a high polymerization catalytic activity at an initial style in the use of the catalyst is used. However, this catalyst has a poor retention in the catalytic activity. Accordingly, in the second step of the propylene block copolymer-producing process, the catalyst exhibits a reduced catalytic activity, and thus the production of the propylene block copolymer at a high yield is difficult.

To increase the yield of the copolymer in the second step, the following attempts have been made.

(1) The polymerization time in the first step is shortened to restrict the deactivation of the catalyst during the first step and thus to increase the yield of the copolymer in the second step.

In this attempt, however, the total catalytic efficiency of the polymerization catalyst reduces and the amount of catalyst residue remaining in the resultant copolymer increases. Therefore, the resultant product has an unsatisfactory quality.

(2) The polymerization temperature in the first step is lowered to restrict the deactivation of the polymerization catalyst and thereby to increase the yield of the copolymer in the second step.

In this attempt, however, since the total catalytic efficiency of the catalyst reduces and the stereoregularity of the resultant copolymer decreases, the resultant block copolymer exhibits a reduced rigidity and contains an increased amount of the catalyst residue.

(3) The copolymerization temperature in the second step is raised to enhance the yield of the copolymer in the second step.

In this attempt, the yield of the copolymer in the second step can be enhanced. However, since the elastomeric component in the resultant copolymer exhibits a low molecular weight, an enhancing effect in the impact strength is unsatisfactory and the resultant copolymer exhibits an undesirably increased stickiness.

(4) The second step is carried out under a raised copolymerization pressure to increase the yield of the copolymer in the second step.

In this attempt, however, the polymerization procedure in the second step must be carried out in a high pressure-resistant apparatus which is extremely expensive and thus the cost of the resultant block copolymer becomes high.

(5) The copolymerization time of the second step is made longer.

In this attempt, since the polymerization rate in the second step is lower than that in the first step, the long polymerization time in the second step undesirably causes the total productivity of the process to be reduced.

(6) With respect to a mixing ratio of ethylene to propylene in the second step, ethylene is used in a larger amount than that of propylene.

In this attempt, the proportion in amount of a random copolymer to the whole copolymer produced in the second step is reduced, and the content of ethylene homopolymer contained in the copolymerization product of the second step increases. Therefore, the enhancing effect in the impact strength of the resultant propylene block copolymer is undesirably reduced.

(7) During the copolymerization procedure in the second step, a specific compound is added to the copolymerization mixture. (Japanese Unexamined Patent Publication (Kokai) No. 53-30686)

In this attempt, when a specific compound, for example, an organic aluminum compound is added, the resultant polymer particles in the reactor exhibit an increased stickiness and thus are adhered to each other to form lumps and the operation of the reactor becomes difficult to continuously carry out.

Also, it was attempted to add an aluminum alkoxide to the polymerization mixture. This attempt is, however, disadvantageous in that the stereoregularity of the resultant copolymer is significantly reduced and the resultant copolymer particles are easily adhered to each other.

To prevent the adhesion of the copolymer particles to each other, Japanese Unexamined Patent Publication (Kokai) Nos. 62-132,912, 62-135,509 and 2-117,905 disclose the use of an alkyl lithium or alkyl magnesium. This attempt is, however, disadvantageous in that the use of the above-mentioned compounds causes the resultant copolymerization mixture to exhibit a significantly reduced catalytic activity.

To prevent the adhesion of the copolymer particles to each other and enhance the copolymerization activity of the copolymerization mixture, Japanese Unexamined Patent Publication (Kokai) No. 58-213,012 discloses the co-use of an aluminum alkoxide and a hydrocarbon, and clearly stresses that if the abovementioned compounds are not used altogether, are desired effects do not appear.

To improve the fluidity of the block copolymer, Japanese Unexamined Patent Publication (Kokai) No. 61-69,823 discloses an addition of a metal alkoxide, Japanese Unexamined Patent Publication (Kokai) No. 61-215,613 discloses an addition of a compound having a Si—O—C bond, Japanese Unexamined Patent Publication (Kokai) No. 63-146,914 discloses an addition of a siloxane compound, and Japanese Unexamined Patent Publication (Kokai) Nos. 3-292,311 and 4-136,010 disclose an addition of a silicon compound. These attempts are disadvantageous either in reduction of activity of the resultant polymerization mixture or in reduction of stereoregularity of the resultant copolymer.

Also, to restrict a production of by-products and improve a processability of the resultant block copolymer, an addition of a specific electron donor is attempted in Japanese Unexamined Patent Publication (Kokai) Nos. 56-151,713, 61-69,821, 61-69,822, 61-69,823, and 63-43,915.

Also, Japanese Unexamined Patent Publication (Kokai) No. 4-331,219 discloses an attempt to feed a saturated hydrocarbon having 3 to 5 carbon atoms into the copolymerization mixture.

However, these attempts are unsatisfactory in that the polymerization activity of the polymerization mixture and/or the molecular weight of the resultant copolymer is reduced, and the process cost becomes high because the additive must be employed in a large amount.

SUMMARY OF THE INVENTION

An object of the present invention is to provide a process for producing a propylene block copolymer at a final stage of which process a copolymerization of propylene can be carried out with an enhanced copolymerization activity.

Another object of the present invention is to provide a process for producing a propylene block copolymer having a high molecular weight and an excellent fluidity, by a simple and easy operation.

The above-mentioned objects can be attained by the process of the present invention for producing a propylene block copolymer, comprising the steps of:

(1) bringing a first feed material consisting of a member selected from the group consisting of propylene and mixtures of propylene with at least one ethylenically unsaturated hydrocarbon monomer different from propylene into contact with a catalyst comprising a catalytic solid component (A) containing titanium, a catalytic component (B) comprising at least one organic aluminum compound and a catalytic component (C) comprising at least one silicon compound having at least one alkoxyl group, to prepare a first crystalline polymer mixture containing the catalyst; and (2) feeding a second feed material in a gas phase and consisting of propylene and at least one ethylenically unsaturated hydrocarbon monomer different from propylene, into the resultant first crystalline polymer mixture, without deactivating the catalyst in the first crystalline polymer mixture, in the presence of a saturated hydrocarbon compound having 6 or more carbon atoms, to copolymerize the additional feed material in the presence of the first crystalline polymer and thereby to form a propylene block copolymer.

BRIEF DESCRIPTION OF THE DRAWING

FIG. 1 is a flow chart of the process of the present invention.

DESCRIPTION OF THE PREFERRED EMBODIMENTS

Referring to FIG. 1, a polypropylene block copolymer is produced by the process of the present invention, in which a catalyst is prepared from a catalytic solid component (A) containing titanium, a catalytic component (B) consisting of at least one organic aluminum compound and a catalytic component (C) consisting of at least one silicon compound having an alkoxyl group; in step (1), a first feed material consisting of propylene or a mixture of propylene with at least one ethylenically unsaturated hydrocarbon monomer other than propylene is polymerized in the presence of the catalyst; and in step (2), a second feed material consisting of propylene and at least one ethylenically unsaturated hydrocarbon monomer other than propylene is fed into the polymerization product mixture produced in step (1), without deactivating the catalyst, and subjected to a copolymerization in the presence of a saturated hydrocarbon compound having 6 or more carbon atoms.

In the catalyst usable for the process of the present invention, the titanium-containing catalytic solid component (A) is selected from supported type high activity catalysts containing magnesium, titanium, a halogen element and an electron donor. No specific limitation is applied to the process for preparing the catalytic solid component (A). For example, the catalytic solid component (A) can be prepared by the processes disclosed in Japanese Unexamined Patent Publication (Kokai) Nos. 54-94,590, 56-55,405, 56-45,909, 56-163,102, 57-63,310, 57-115,408, 58-83,006 58-83,016, 58-138,707, 59-149,905, 60-23,404, 60-32,805, 61-55,104, 2-77,413, and 2-117,905. In a typical process for producing the catalytic solid component (A), (1) a magnesium compound, for example, magnesium chloride is pulverized together with an electron donor and a titanium halide, for example, titanium tetrachloride ($TiCl_4$), or (2) a magnesium compound and an electron donor are dissolved together in a solvent and then to the resultant solution is added a titanium halide compound to allow a catalytic solid material to precipitate from the solution.

As a catalytic solid component (A) usable for the process of the present invention, those disclosed in Japanese Unexamined Patent Publication Nos. 60-152,511, 61-31,402 and 62-81,405 are preferably utilized to attain the specific effects of the present invention. In the processes disclosed in the above-mentioned publications, an aluminum halide is reacted with an organic silicon compound and then with a Grignard compound to cause a solid material to precipitate from the reaction mixture. As an aluminum halide usable for the above-mentioned processes, anhydrous aluminum halides are preferably employed. However, since the aluminum halides have a high moisture absorbing property, it is difficult to obtain an absolutely anhydrous aluminum halide. An aluminum halide containing a small amount of water can be used for the catalyst component (A)-producing process. The aluminum halide is preferably selected from aluminum trichloride, aluminum tribromide and aluminum triiodide. The aluminum trichloride is more preferably utilized for this catalyst component (A)-producing process.

The organic silicon compound usable for the abovementioned catalytic component (A)-producing process is preferably selected from the group consisting of mono, di, tri and tetra alkoxysilane compounds, for example, tetramethoxysilane, tetraethoxysilane, tetrabutoxysilane, methyltriethoxysilane, ethyltributoxysilane, phenyltrimethoxysilane, phenyltributoxysilane, dimethyldiethoxysilane, diphenyldimethoxysilane, diphenyldiethoxysilane, trimethylmonoethoxysilane, and trimethylmonobutoxysilane.

Tetraethoxysilane, methyltriethoxysilane, phenyltrimethoxysilane and dimethyldiethoxysilane are more preferably employed for the present invention.

In the reaction of the aluminum halide with the organic silicon compound, those compounds are employed preferably in an atomic ratio of Al to Si of 0.4 to 1.5, more preferably 0.7 to 1.3. In this reaction, an inert reaction medium consisting of hexane and/or toluene is preferably used. The reaction temperature is preferably in a range of from 10° to 100° C. more preferably 20° to 80° C., and the reaction time is preferably 0.2 to 5 hours, more preferably 0.5 to 3 hours.

The Grignard compound usable for the catalyst component (A)-producing reaction is preferably selected from the group consisting of organic magnesium halides, for example, ethylmagnesium chloride, propylmagnesium chloride, butylmagnesium chloride, hexylmagnesium chloride, octylmagnesium chloride, ethylmagnesium bromide, propylmagnesium bromide, butylmagnesium bromide and ethylmagnesium iodide. As a solvent for the Grignard compound, aliphatic ether compounds, for example, diethylether, dibutylether, di-isopropylether and di-isoamylether; and cycloaliphatic ether compounds, for example, tetrahydrofuran.

The Grignard compound is employed preferably in an amount corresponding to an atomic ratio (Mg/Al) of magnesium in the Grignard compound to aluminum in the aluminum halide used for the preparation of the reaction product with the organic silicon compound, of 0.5 to 3.0, more preferably 1.5 to 2.3. The reaction temperature is preferably from −50° to +100° C., more preferably −20° to +80° C. The reaction time is preferably 0.2 to 5 hours, more preferably 0.5 to 3 hours.

From the reaction of the aluminum halide with the organic silicon compound and then with the Grignard compound, a substantially white (colorless) solid product is obtained. The colorless solid product is subjected to a contact treatment with an electron donor and then a contact treatment with a titanium halide. The contact treatments can be carried out by a conventional method. For example, the solid product is dispersed in an inert solvent, and then an electron donor and/or a titanium halide is dissolved in the inert solvent. Alternatively, the solid product is dispersed in the electron donor and/or a liquid titanium halide, without using the inert solvent. In the contact treatment of the solid product with the electron donor and/or the titanium halide, the resultant mixture is stirred. The contact treatment temperature is preferably 50° to 150° C. There is no limitation to the contact treatment time. Usually, the contact treatment time is 0.2 to 5 hours. The contact treatment may be repeated plural times.

The titanium halide compound usable for the contact treatment is preferably selected from the group consisting of tetrachlorotitanium, tetrabromotitanium, trichloromonobutoxytitanium, tribromonoethoxytitanium, trichloromono-iso-propoxytitanium, dichlorodiethoxytitanium, dichlorodibutoxytitanium, monochlorotriethoxytitanium, and monochlorotributoxytitanium. Particularly, tetrachlorotitanium and trichloromonobutoxytitanium are more preferably used for the contact treatment.

The electron donor usable for the contact treatment is preferably selected from aromatic carboxylic acid esters, more preferably from orthophthalic acid diesters. Particularly, the aromatic carboxylic acid ester is selected from diethyl orthophthalate, di-iso-butyl orthophthalate, dipentyl orthophthalate, dihexyl orthophthalate, di-n-octyl orthophthalate, di-2-ethylhexyl orthophthalate and di-n-heptyl orthophthalate.

After the above-mentioned contact treatment, the treated solid product is separated from the treatment mixture, and fully washed with an inert solvent. Then, the resultant solid product can be used as a catalytic solid component (A) of the catalyst for the process of the present invention.

The catalytic component (B) usable for the catalyst comprises an organic aluminum compound, for example, halogenoalkyl aluminum compounds and trialkyl aluminum compounds.

The halogenoalkyl aluminum compounds include diethylaluminummonochloride, dibutylaluminum monochloride, di-n-propylaluminum monochloride, methylaluminum sesquichloride, ethylaluminum sesquichloride, butylaluminum sesquichloride and butylaluminum sesquibromide.

The trialkylaluminum compounds include trimethylaluminum, triethylaluminum, triisobutylaluminum, trihexylaluminum and trioctylaluminum.

The catalytic component (B) consists of a single organic aluminum compound or a mixture of two or more organic aluminum compounds. Also, the catalytic component (B) may contain a polyaluminoxane prepared by a reaction of an alkylaluminum with water.

When a catalytic solid comprising, as indispensable ingredients, magnesium, titanium, a halogen and an electron donor is used as a catalytic solid component (A), the catalytic component (B) preferably consists of at least one trialkyl aluminum as the organic aluminum compound. The trialkylaluminum in the catalytic component (B) is used preferably in an amount corresponding to an atomic ratio of aluminum to titanium contained in the catalytic solid component (A), of 20 to 1000, more preferably 150 to 500.

The alkoxyl group-containing silicon compound usable for the catalytic component (C) is preferably selected from the group consisting of mono, di, tri and tetra-alkoxysilanes, for example, tert-butylmethyl dimethoxysilane, tert-butylethyl dimethoxysilane, tert-butylpropyl dimethoxysilane, di-tert-butyl dimethoxysilane, di-isopropyl dimethoxysilane, cyclohexylmethyl dimethoxysilane, dicyclohexyl dimethoxysilane, dicyclopentyl dimethoxysilane, tetramethoxysilane, tetraethoxysilane, tetra-n-propoxysilane, tetra-n-butoxysilane, tetra-isopentoxysilane, tetra-n-hexoxysilane, methyl trimethoxysilane, methyl triethoxysilane, methyl tri-n-butoxysilane, methyl tri-isopentoxysilane, methyl tri-n-hexoxysilane, ethyl triethoxysilane, ethyl tri-isopropoxysilane, ethyl tri-isopentoxysilane, n-butyl triethoxysilane, isobutyl triethoxysilane, isopentyl triethoxysilane, isopentyl tri-n-butoxysilane, dimethyl diethoxysilane, dimethyl di-n-butoxysilane, dimethyl di-isopentoxysilane, diethyl diethoxysilane, diethyl di-isopentoxysilane, di-isobutyl di-isopentoxysilane, di-n-butyl diethoxysilane, di-isobutyl di-isopentoxysilane, trimethyl methoxysilane, trimethyl ethoxysilane, trimethyl isobutoxysilane, triethyl isopropoxysilane, tri-n-propyl ethoxysilane, tri-n-butyl ethoxysilane, tri-isopentyl ethoxysilane, phenyl triethoxysilane, phenyl tri-isobutoxysilane, phenyl tri-isopentoxysilane, diphenyl diethoxysilane, diphenyl di-isopentoxysilane, diphenyl dioctoxysilane, triphenyl methoxysilane, phenylmethyl dimethoxysilane, triphenyl ethoxysilane, triphenyl isopentoxysilane, benzyl triethoxysilane, benzyl tributoxysilane, dibenzyl diethoxysilane, cyclopentyl trimethoxysilane, cyclohexylmethyl dimethoxysilane, 2-methylcyclopentyl trimethoxysilane, 2,3-dimethylcyclopentyl trimethoxysilane, cyclopentyl triethoxysilane, and tricyclopentyl ethoxysilane.

The catalytic component (C) may consist of a single alkoxysilane compound or a mixture of two or more alkoxysilane compounds. The alkoxysilane compound for the catalytic component (C) is used preferably in an amount of 0.01 to 5 moles, more preferably 0.1 to 1 mole, per mole of the catalytic component (B).

In the step (1) of the process of the present invention, the first feed material consists of propylene alone or a mixture of propylene with at least one ethylenically unsaturated hydrocarbon monomer different from propylene. The ethylenically unsaturated hydrocarbon monomer different from propylene is preferably selected from the group consisting of ethylene; α-olefinic compounds different from propylene, for example, butene-1, 3-methylbutene-1, 3-methylpentene-1, 4-methylpentene-1, hexene-1, 4-methylhexene-1 and octene-1; arylethylene compounds, for example, styrene, 2-vinyl naphthalene and 9-vinyl antracene; alkylarylethylene compounds, for 2-methylstyrene, 3-methylstyrene and 4-methylstyrene; cycloalkylethylene compounds, for example, vinyl cyclohexane and vinyl cyclopentane; cyclic olefin compounds, for example, cyclopentene, cyclohexene, and norbornene; and diene compounds, for example, dicyclopentadiene, 5-ethylidene-norbornene-2, 4-vinyl cyclohexene and 1,5-hexadiene.

In the step (1), the copolymerized ethylenically unsaturated hydrocarbon monomer different from propylene must be in an amount in which the specific properties of polypropylene do not disappear, for example, of 10% by weight or less based on the total weight of the first crystalline polymer prepared in step (1). If the content of the copolymerized ethylenically unsaturated hydrocarbon monomer different from propylene is more than 10% by weight, sometimes, an amount of undesirable by-products consisting of low stereoregularity polymers increases in step (1).

For the purpose of regulating the molecular weight of the resultant polymer in step (1) the first polymerization in step (1) is carried out optionally in the presence of a chain transfer agent consisting of hydrogen.

After a crystalline polymer is produced by a homopolymerizaiton of propylene alone or a copolymerization of propylene with at least one ethylenically unsaturated hydrocarbon monomer other than propylene in step (1), the resultant first crystalline polymer mixture containing the catalyst is supplied to step (2) without deactivating the catalyst. In step (2), a second feed material consisting of propylene and at least one ethylenically unsaturated hydrocarbon monomer different from propylene is fed, in a gas phase, into the first crystalline polymer mixture obtained from step (1), in the presence of at least one saturated hydrocarbon compound having 6 or more carbon atoms, preferably 6 to 12 carbon atoms. Then, the second feed material is copolymerized in a gas phase in the presence of the first crystalline polymer and thereby a propylene block copolymer is obtained. In step (2) the catalyst used in step (1) is successively employed for the copolymerization of the second feed material.

The saturated hydrocarbon compounds having 6 or more carbon atoms usable for step (2) of the process of the present invention are preferably selected from aliphatic unsaturated hydrocarbons having 6 or more carbon atoms, for example, hexane, heptane, octane, decane and dodecane; cycloaliphatic saturated hydrocarbons having 6 or more carbon atoms, for example, cyclohexane and methyl cyclohexane; and halogenation products of the abovementioned hydrocarbons. Among them, hexane and heptane are more preferred for step (2) of the process of the present invention.

In step (2), the amount of the saturated hydrocarbon compound is not restricted to a specific level, as long as the saturated hydrocarbon compound can provide a saturated vapor pressure thereof in the gas phase copolymerization system and thus can exist in a liquid state in this system. Preferably, the saturated hydrocarbon compound is used in an amount of 0.1 to 500 g, more preferably 1 to 200 g, per kg of the first crystalline polymer prepared in step (1).

No restriction is applied to the method of adding the saturated hydrocarbon compound to the copolymerization system in step (2). Namely, the saturated hydrocarbon compound may be added to the copolymerization system of step (2) in a single stroke addition operation, in a continuous addition operation or in a periodical addition operation. The continuous addition operation is especially preferable for step (2). When the saturated hydrocarbon compound is continuously added, the addition rate is preferably 0.01 to 3 g per kg of the first crystalline polymer obtained in step (1).

The propylene block copolymer produced by the process of the present invention comprises crystalline polymeric fractions derived from the first crystalline polymer produced in step (1) and elastomeric fractions derived from the copolymer produced in step (2) and incorporated or mixed into the crystalline polymeric fractions.

In the propylene block copolymer of the present invention, the elastomeric copolymer fractions are preferably in an amount of 3 to 40%, more preferably 5 to 30%, based on the total weight of the resultant propylene block copolymer. In the elastomeric copolymer fractions prepared in step (2), the content of the copolymerized ethylenically unsaturated hydrocarbon monomer other than propylene is preferably 10 to 40% by weight based on the total weight of the elastomeric copolymer fractions.

With respect to the type of polymerization in the process of the present invention, preferably, the homo- or co-polymerization of step (1) is carried out by a bulk polymerization method in which a liquid monomer serves as a polymerization medium, and the copolymerization of step (2) is carried out by a gas phase polymerization method in which the feed material in the state of a gas is brought into contact with a catalyst.

The bulk polymerization in step (1) is carried out at the temperature and under the pressure at which the first feed material consisting of propylene alone or a mixture of propylene with at least one ethylenically unsaturated hydrocarbon monomer other than propylene can be maintained in the state of a liquid. The polymerization temperature is preferably 30° to 90° C., more preferably 50° to 80° C., and the polymerization time is preferably 5 minutes to 5 hours.

In the gas phase copolymerization in step (2), each of the polymerization temperature and pressure is set forth so that the second feed material consisting of propylene and at least one ethylenically unsaturated hydrocarbon monomer other than propylene is maintained in the state of a gas.

The ethylenically unsaturated hydrocarbon monomer different from propylene for step (2) is selected from the group consisting of, for example, ethylene; α-olefinic compounds different from propylene, for example, butene-1, 3-methylbutene-1, 3-methylpentene-1, 4-methyl-pentene-1, hexene-1, 4-methylhexene-1 and octene-1; arylethylene compounds, for example, styrene, 2-vinyl naphthalene and 9-vinyl anthracene; alkylarylethylene compounds, for example, 2-methylstyrene, 3-methylstyrene and 4-methylstyrene; cycloalkylethylene compounds, for example, vinyl cyclohexane and vinyl cyclopentane; cyclic olefin compounds, for example, cyclopentene, cyclohexene and norbornene; and diene compounds, for example, dicyclopentadiene, 5-ethylidene norbornene-2, 4-vinyl cyclohexane and 1,5-hexadiene.

The gas phase copolymerization in step (2) is preferably carried out under a pressure of from the ambient atmospheric pressure to 20 kg/cm$^2$G, more preferably from 2 kg/cm$^2$G to 12 kg/cm$^2$G, at a temperature of from 30° to 95° C., more preferably from 40° to 70° C. The copolymerization time is preferably 30 minutes to 10 hours, more preferably 1 to 5 hours.

Where the catalytic solid component (A) consists of a solid material comprising, as indispensable ingredients, magnesium, titanium, a halogen and an electron donor, before the polymerization procedure of step (1), a restricted amount of propylene may be preliminarily polymerized in the presence of the catalytic solid component (A) together with a catalytic component (B) comprising an organic aluminum compound and a catalytic component (C) comprising a silicone compound having at least one alkoxyl group.

When the preliminary polymerization product mixture in the form of a solid, which may be one washed with an aliphatic hydrocarbon solvent, for example, n-hexane, is used as a solid catalyst for steps (1) and (2), the polymerization activity of each polymerization mixture per unit amount of the solid catalyst and the stereoregularity of the resultant propylene block copolymer can be enhanced.

Where the preliminary polymerization product mixture is used as a catalytic solid component (A), the use of the alkoxyl group-containing silicon compound as a catalytic component (C) can be omitted.

The preliminary polymerization can be carried out by a gas phase method, slurry method or bulk method. The obtained catalytic solid product from the preliminary polymerization is separated from the reaction mixture and then used for the polymerization steps (1) and (2). Alternatively, the preliminary polymerization solid product mixture is directly used for the steps (1) and (2) without separating the catalytic solid product.

The preliminary polymerization is preferably carried out for 0.1 to 10 hours until the catalytic solid product is obtained at a yield of 0.1 to 100 g per g of the catalytic solid component (A) used in the preliminary polymerization. If the yield of the solid product is less than 0.1 g per g of the catalytic solid component (A), the resultant catalyst exhibits an unsatisfactory catalytic activity, the content of the catalyst residue contained in the resultant propylene block copolymer undesirably increases, and the stereoregularity of the resultant copolymer becomes unsatisfactory. Also, when the yield of the solid product is more than 100 g per g of the catalytic solid component (A), the resultant copolymer exhibits a reduced crystallinity.

The preliminary polymerization of propylene is carried out in the presence of the catalytic components (A), (B), and (C), preferably at a temperature of 0° to 100° C., more preferably 5° to 60° C. Where the preliminary polymerization of propylene is carried out at a relatively high temperature of, for example, 50° C. or more, it is preferred to make the concentration of propylene lower and/or the polymerization time shorter. If not, it becomes difficult to control the yield of the solid product to a level of from 0.1 to 100 g per g of the catalytic solid component (A) and the propylene block copolymer produced by steps (1) and (2) exhibits a reduced crystallinity.

In the preliminary polymerization, the catalytic component (B) containing an organic aluminum compound is used preferably in an amount corresponding to an atomic ratio (Al/Ti) of aluminum contained in the catalytic component (B) to titanium contained in the catalytic solid component (A) of 0.5 to 1000, more preferably 1 to 500.

Also, the catalytic component (C) containing an alkoxyl group-containing silicon compound is used preferably in an amount corresponding to an atomic ratio (Si/Al) of silicon contained in the catalytic component (C) to aluminum contained in the catalytic component (B), of 0.001 to 1, more preferably 0.1 to 0.5.

The preliminary polymerization may be carried out in the presence of hydrogen, if necessary.

The process of the present invention is useful for producing a propylene block copolymer having a high fluidity and a high molecular weight and comprising elastomeric fractions derived from a copolymerization of propylene with at least one ethylenically unsaturated hydrocarbon monomer defferent from propylene and having a high molecular weight, and having a high mobility and a high molecular weight, at a high efficiency and at a high operational stability.

EXAMPLES

The present invention will be further explained by the following examples.

In the examples, the term "copolymerization yield" refers to a percentage of the copolymer fractions produced in step (2) based on the total weight of the resultant propylene block copolymer.

The molecular weight of the copolymer fractions produced in step (2) was determined by using a GPC (available under a trademark of GPC Type 150CV from Waters Co., Ltd, at a polymer concentration of 0.07 wt/V % in a solvent consisting of 8-dichlorobenzene and 0.5% of BHT, at a temperature of 135° C.

EXAMPLE 1

(1) Preparation of a catalytic solid component (A)

A solution was prepared by dissolving 15 millimoles of anhydrous aluminum chloride in 50 ml of toluene, 15 millimoles of methyl triethoxysilane was added dropwise to the solution at a temperature of 25° C. while stirring the resultant reaction mixture. After the addition was completed, the reaction mixture was further stirred at 25° C. for one hour to cause the above-mentioned compounds to react with each other. Then, the reaction product mixture was cooled to a temperature of −5° C. To the cooled reaction product mixture, 20 ml of a solution containing 30 millimoles of butylmagnesium chloride dissolved in di-isoamylether was added dropwise over a time of 30 minutes, and the resultant mixture was kept at −5° C. for 30 minutes and then heated upto a temperature of 25° C. over a period of 30 minutes. Then, the mixture was kept at 25° C. for one hour to allow a solid product to precipitate from the mixture. The precipitated solid product was collected by a filtration, washed with toluene and then with heptane, and then dispersed in 30 ml of toluene.

To the dispersion were added 150 ml of titanium tetrachloride and 4.0 millimoles of di-n-heptyl phthalate. The mixture was subjected to a reaction at a temperature of 90° C. for one hour. At this temperature, the resultant solid product was collected by a filtration, washed with toluene and then with heptane, and then dispersed again in 30 ml of toluene. To the dispersion, 150 ml of titanium tetrachloride was added, and the resultant mixture was kept at a temperature of 90° C. for one hour. Thereafter, the resultant solid product was collected by a filtration, and fully washed with toluene and then with heptane. The washed solid product was dried at a temperature of 30° C. in a nitrogen gas atmosphere to provide a catalytic solid component (A). The component (A) contained titanium in an amount of 2.7% by weight.

(2) Preliminary polymerization

A weight of a stainless steel autoclave having a capacity of 2 liters and equipped with a stirrer was measured. The autoclave was charged in a nitrogen gas atmosphere with 2 ml of a solution of 1.8 millimoles of a triethyl aluminum in n-hexane, 3.3 ml of a solution of 0.3 millimole of di-isopropyl dimethoxysilane diluted by n-heptane, hydrogen in an amount corresponding to a pressure of 7.0 kg/cm$^2$ G and 900 ml of a liquid propylene. After closing, the inside temperature of the autoclave was adjusted to 10° C. while stirring. The catalytic solid component (A) mentioned above was charged in an amount of 8.0 mg (titanium content: 2.7% by weight) under pressure, and propylene was subjected to a preliminary polymerization at a temperature of 10° C. for 10 minutes.

(3) Polymerization of propylene in a liquid phase in step (1)

After the preliminary polymerization was completed, the autoclave was heated in a separate bath at a temperature of 60° C., and propylene in the autoclave was subjected to a bulk polymerization at the same temperature as mentioned above for 15 minutes while stirring the reaction mixture. Then, non-reacted gas was discharged from the polymerization system, and the pressure of the autoclave was adjusted to a level of 0.25 kg/cm$^2$ G. The weight of the autoclave was measured. A yield of the resultant polypropylene was determined from a difference in weight of the autoclave between before and after the polymerization and the weight of the discharged gas. The yield of the polypropylene was 110 g.

(4) Copolymerization in a gas phase in step (2)

After the completion of the bulk polymerization, the inside temperature of the autoclave containing the polymerization product mixture and kept under an inside pressure of 0.25 kg/cm$^2$ G was adjusted to a level of 40° C. A mixed gas containing ethylene and propylene in a mixing ratio of 1:1 by volume was each fed at a feed rate of 150N ml/min into the autoclave and the copolymerization pressure was controlled to a level of 2.0 kg/cm$^2$ G. At the temperature and under the pressure as mentioned above, the mixed gas was subjected to a copolymerization, while continuously feeding 2.7 ml of n-heptane, over a time of 3 hours. During the copolymerization, the inside pressure of the autoclave was maintained at a level of 2.0 kg/cm$^2$ G, by discharging the non-reacted gas from the autoclave. Then, the autoclave was opened, and the inside of the autoclave was observed. It was confirmed that the inside wall surface and the stirrer wings were completely free from adhesion of the resultant copolymer. Also, it was found that the resultant copolymer had an excellent fluidity.

The resultant propylene block copolymer was dried at a temperature of 60° C. under a reduced pressure for 20 hours.

The resultant propylene block copolymer had a weight average molecular weight of $50.5 \times 10^4$ and was obtained at a yield of 143 g. The copolymer produced in the gas phase copolymerization in step (2) was in an amount of 33 g (=143 g−110 g) and the copolymerization yield thereof was 23.08% by weight.

EXAMPLE 2

A propylene block copolymer was produced by the same procedures as in Example 1 except that in the gas phase copolymerization in step (2), n-heptane was added in an amount of 10.0 ml.

When the bulk polymerization of propylene in step (1) was completed, the resultant polypropylene was obtained in a yield of 111 g. After the gas phase copolymerization in step (2) was completed, the total amount of the propylene block copolymer was 139 g. The propylene block copolymer had a weight average molecular weight of $53.4 \times 10^4$.

It was confirmed that no adhesion of the resultant copolymer was found on the inside wall surface of the autoclave and the wings of the stirrer, and the resultant copolymer exhibited an excellent fluidity.

The amount of the copolymer produced by the gas phase copolymerization in step (2) was 28 g and the copolymerization yield was 20.14% by weight.

EXAMPLE 3

A propylene block copolymer was produced by the same procedures as in Example 1 except that in the gas phase copolymerization in step (2), n-heptane was added in an amount of 15.6 ml.

When the bulk polymerization of propylene in step (1) was completed, the resultant polypropylene was obtained in a yield of 110 g. After the gas phase copolymerization in step (2) was completed, the total amount of the propylene block copolymer was 139 g. The propylene block copolymer had a weight average molecular weight of $52.8 \times 10^4$.

It was confirmed that no adhesion of the resultant copolymer was found on the inside wall surface of the autoclave and the wings of the stirrer, and the resultant copolymer exhibited an excellent fluidity.

The amount of the copolymer produced by the gas phase copolymerization in step (2) was 24 g and the copolymerization yield was 17.91% by weight.

EXAMPLE 4

A propylene block copolymer was produced by the same procedures as in Example 1 except that in the gas phase copolymerization in step (2), 10.2 ml of n-hexane was used in phase of n-heptane.

When the bulk polymerization of propylene in step (1) was completed, the resultant polypropylene was obtained in a yield of 111 g. After the gas phase copolymerization in step (2) was completed, the total amount of the propylene block copolymer was 136 g. The propylene block copolymer had a weight average molecular weight of $53.4 \times 10^4$.

It was confirmed that no adhesion of the resultant copolymer was found on the inside wall surface of the autoclave and the wings of the stirrer, and the resultant copolymer exhibited an excellent fluidity.

The amount of the copolymer produced by the gas phase copolymerization in step (2) was 25 g and the copolymerization yield was 18.38% by weight.

Comparative Example 1

A propylene block copolymer was produced by the same procedures as in Example 1 except that in the gas phase copolymerization in step (2), no saturated hydrocarbon compound was added.

When the bulk polymerization of propylene in step (1) was completed, the resultant polypropylene was obtained in an amount of 111 g. After the gas phase copolymerization in step (2) was completed, the total amount of the propylene block copolymer was 123 g. The propylene block copolymer had a weight average molecular weight of $35.2 \times 10^4$.

It was found that white powder consisting of the resultant copolymer adhered to the inside wall surface of the autoclave and the wings of the stirrer, and a portion of the resultant copolymer located on the bottom of the autoclave was agglomerated.

The amount of the copolymer produced by the gas phase copolymerization in step (2) was 12 g and the copolymerization yield was 9.76% by weight.

We claim:

1. A process for producing a propylene block copolymer comprising the steps of:

(1) bringing a first feed material in a liquid phase and consisting of a member selected from the group consisting of propylene and mixtures of propylene with at least one ethylenically unsaturated hydrocarbon monomer different from propylene into contact with a catalyst comprising a catalytic solid component (A) containing titanium, a catalytic component (B) comprising at least one organic aluminum compound and a catalytic component (C) comprising at least one silicon compound having at least one alkoxyl group, to prepare a first crystalline polymer mixture containing the catalyst; and (2) feeding a second feed material in a gas phase and consisting of propylene and at least one ethylenically unsaturated hydrocarbon monomer different from propylene, into the resultant first crystalline polymer mixture, without deactivating the catalyst in the first crystalline polymer mixture, in the presence of a saturated hydrocarbon compound having 6 or more carbon atoms and in a total amount sufficient to provide a saturated vapor pressure thereof in this copolymerization system, to copolymerize the second feed material into a second elastomeric copolymer in the presence of the first crystalline polymer and thereby to form a propylene block copolymer comprising crystalline polymeric fractions derived from the first crystalline polymer produced in step (1) and elastomeric copolymer fractions derived from the second elastomeric copolymer produced in step (2), the elastomeric copolymer fractions being incorporated or mixed into the crystalline polymeric fractions.

2. The process as claimed in claim 1, wherein in each of steps (1) and (2), the ethylenically unsaturated hydrocarbon monomer different from propylene is selected from the group consisting of ethylene, α-olefinic compounds different from propylene, arylethylene compounds, alkylarylethylene compounds, cycloalkylethylene compounds, cyclic olefin compounds and diene compounds.

3. The process as claimed in claim 1, wherein in step (1), the first feed material comprises propylene and at least one ethylenically unsaturated hydrocarbon monomer different from propylene, and the resultant first crystalline polymer contains copolymerized ethylenially unsaturated hydrocarbon in an amount of 10% by weight or less, based on the total weight of the first crystalline polymer.

4. The process as claimed in claim 1, wherein the first polymerization in step (1) is carried out in the presence of a chain transfer agent consisting of hydrogen.

5. The process as claimed in claim 1, wherein the bulk polymerization in step (1) is carried out at a temperature of 30° to 90° C.

6. The process as claimed in claim 1, wherein the saturated hydrocarbon compound used in step (2) is selected from the group consisting of hexane, heptane, octane, decane, dodecane, cyclohexane, methylcyclohexane and halogenated products of the above-mentioned hydrocarbons.

7. The process as claimed in claim 1, wherein the saturated hydrocarbon compound is used in an amount of 0.1 to 500 g per kg of the first crystalline polymer prepared in step (1).

8. The process as claimed in claim 1, wherein the saturated hydrocarbon compound is continuously fed into the block copolymerization mixture at a feed rate of 0.01 to 3 g/min per kg of the crystalline polymer prepared in step (1).

9. The process as claimed in claim 1, wherein the elastomeric fractions are in an amount of 3 to 40% by weight based on the total weight of the resultant polypropylene block copolymer.

10. The process as claimed in claim 9, wherein the elastomeric fractions contain the copolymerized ethylenically unsaturated hydrocarbon different from propylene in an amount of 10 to 40% by weight based on the total weight of the elastomeric fractions.

11. The process as claimed in claim 1, wherein the copolymerization in step (2) is carried out at a temperature of 40° to 70° C. under a pressure of from the ambient atmospheric pressure to 20 kg/cm² G.

12. The process as claimed in claim 1, wherein before step (1), propylene is preliminarily polymerized in the presence of the catalyst, and the resultant catalyst-containing propylene polymer solid is used as a catalyst in step (1).

13. The process as claimed in claim 12, wherein the catalyst-containing propylene polymer solid contain the propylene polymer in an amount of 0.1 to 100 g per g of the titanium-containing catalytic solid component (A).

14. The process as claimed in claim 12, wherein the preliminary polymerization of propylene is carried out at a temperature of from 0° to 100° C.

15. The process as claimed in claim 12, wherein the preliminary polymerization catalyst contain the organic aluminum-containing catalytic component (B) in an amount corresponding to an atomic ratio of aluminum derived from the component (B) to titanium derived from the titanium-containing catalytic solid component (A) of 0.5 to 1,000, and the silicon compound-containing catalytic component (C) in an amount corresponding to an atomic ratio of silicon derived from the component (C) to aluminum derived from the component (B) of 0.01 to 1.

\* \* \* \* \*

UNITED STATES PATENT AND TRADEMARK OFFICE
CERTIFICATE OF CORRECTION

PATENT NO. : 5,468,810
DATED : November 21, 1995
INVENTOR(S) : Tetsuo HAYAKAWA et al.

It is certified that error appears in the above-indentified patent and that said Letters Patent is hereby corrected as shown below:

Claim 3, column 14, line 7, "ethylenially" should read --ethylenically--.

Signed and Sealed this

Fourteenth Day of May, 1996

Attest:

BRUCE LEHMAN

*Attesting Officer*   *Commissioner of Patents and Trademarks*